United States Patent
Hu et al.

(10) Patent No.: US 8,385,158 B1
(45) Date of Patent: Feb. 26, 2013

(54) METHOD AND SYSTEM FOR PROVIDING A MAGNETIC RECORDING TRANSDUCER HAVING A PLANARIZED NEAR-FIELD TRANSDUCER AND A SLOPED POLE

(75) Inventors: Yufeng Hu, Fremont, CA (US); Ut Tran, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 246 days.

(21) Appl. No.: 12/574,621

(22) Filed: Oct. 6, 2009

(51) Int. Cl.
*G11B 11/00* (2006.01)
(52) U.S. Cl. .................................... 369/13.01
(58) Field of Classification Search .......................... None
See application file for complete search history.

(56) References Cited

U.S. PATENT DOCUMENTS

| | | | |
|---|---|---|---|
| 6,529,449 B1 | 3/2003 | Jordan et al. | |
| 7,272,079 B2 | 9/2007 | Challener | |
| 7,330,404 B2 | 2/2008 | Peng et al. | |
| 7,412,143 B2 | 8/2008 | Rottmayer et al. | |
| 2005/0052771 A1 | 3/2005 | Rausch et al. | |
| 2007/0159720 A1 | 7/2007 | Sohn et al. | |
| 2008/0013912 A1 | 1/2008 | Shukh et al. | |
| 2010/0123965 A1* | 5/2010 | Lee et al. | 360/59 |
| 2010/0208391 A1* | 8/2010 | Gokemeijer | 360/314 |
| 2010/0214684 A1* | 8/2010 | Gao et al. | 360/59 |
| 2010/0214685 A1* | 8/2010 | Seigler et al. | 360/59 |
| 2010/0321815 A1* | 12/2010 | Zhou et al. | 360/59 |
| 2010/0328807 A1* | 12/2010 | Snyder et al. | 360/59 |

* cited by examiner

*Primary Examiner* — Joseph Feild
*Assistant Examiner* — Henok Heyi

(57) ABSTRACT

A method and system for fabricating an energy assisted magnetic recording (EAMR) transducer is described. The EAMR transducer has an air-bearing surface (ABS) and a waveguide. The method includes providing a planarized near field transducer (NFT) for the waveguide and forming a sloped surface on the planarized NFT. The sloped surface has a front edge separated from the ABS by a distance. The method and system also include providing a write pole on the sloped surface.

13 Claims, 16 Drawing Sheets

METHOD AND SYSTEM FOR PROVIDING A MAGNETIC RECORDING TRANSDUCER HAVING A PLANARIZED NEAR-FIELD TRANSDUCER AND A SLOPED POLE

BACKGROUND

FIG. 1 depicts a portion of a conventional energy assisted magnetic recording (EAMR) transducer 10. The conventional EAMR transducer 10 is used in writing to recording media 30. To do so, the conventional EAMR transducer 10 receives light, or energy, from a conventional laser (not shown in FIG. 1). Also shown is grating 20. The conventional EAMR transducer 10 includes a conventional waveguide 12, conventional pole 14, and a conventional near-field transducer (NFT) 16. Also shown is a laser spot 22 on the gratings 20. Other components that may be part of the conventional EAMR transducer 10 are not shown.

In operation, the light from the spot 22 on the grating 20 is coupled to the conventional waveguide 12. The conventional waveguide 12 guides the light to the conventional NFT 16 near the air-bearing surface (ABS). The conventional NFT 16 focuses the energy from the waveguide 12 to an optical spot 32 on the media 30. A small region of the conventional media 30 is heated by the spot 32. This region becomes more magnetically soft. The conventional EAMR transducer 10 magnetically writes data to the heated region of the recording media by energizing the conventional pole 14.

Although the conventional EAMR transducer 10 may function, there are drawbacks. In order to reduce the track size, and thus increase density, the spot 32 size is decreased to prevent heating of adjacent tracks. Thus, the size of the conventional NFT 16 is desired to be small in order to limit the size of the spot 32. Further, the distances between the pole 14 and the conventional NFT 16 and between the conventional NFT 16 and the media 30 are desired to be carefully controlled. In addition, care must be taken in ensuring that the conventional pole 14 and conventional waveguide 12 are sufficiently separated that the magnetic field of the conventional pole 14 does not adversely affect the optical performance of the conventional waveguide 12. Fabrication of a conventional EAMR transducer 10 that takes these factors into consideration may be problematic.

Accordingly, what is needed is a system and method for improving the fabrication of an EAMR transducer.

BRIEF SUMMARY OF THE INVENTION

A method and system for fabricating an energy assisted magnetic recording (EAMR) transducer is described. The EAMR transducer has an air-bearing surface (ABS) and a waveguide. The method includes providing a planarized near-field transducer (NFT) for the waveguide and forming a sloped surface on the planarized NFT. The sloped surface has a front edge separated from the ABS by a distance. The method and system also include providing a write pole on the sloped surface.

DETAILED DESCRIPTION OF THE PREFERRED EMBODIMENTS

Figure 1:
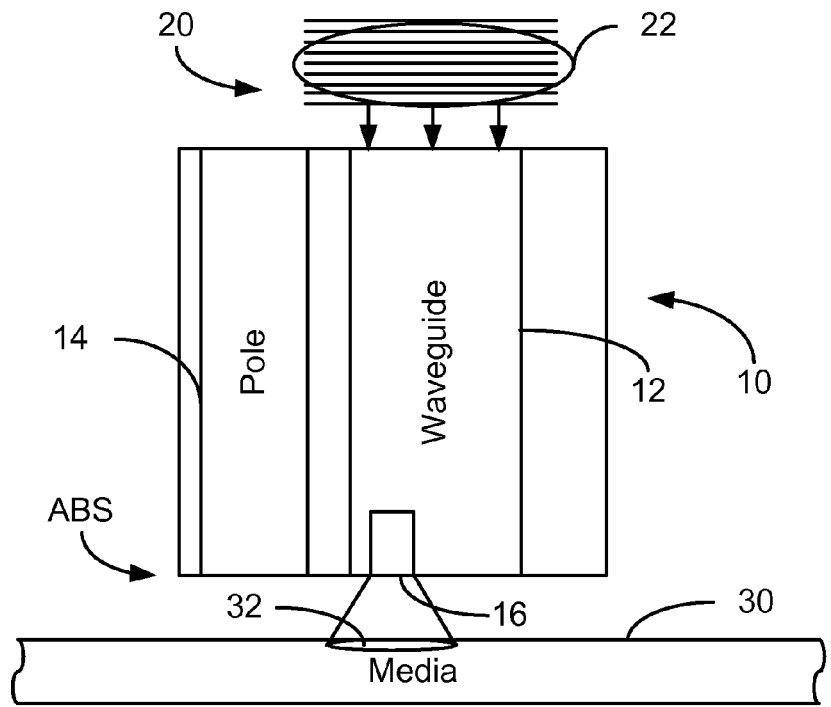
FIG. 1 is depicts a conventional EAMR transducer.
Figure 2:
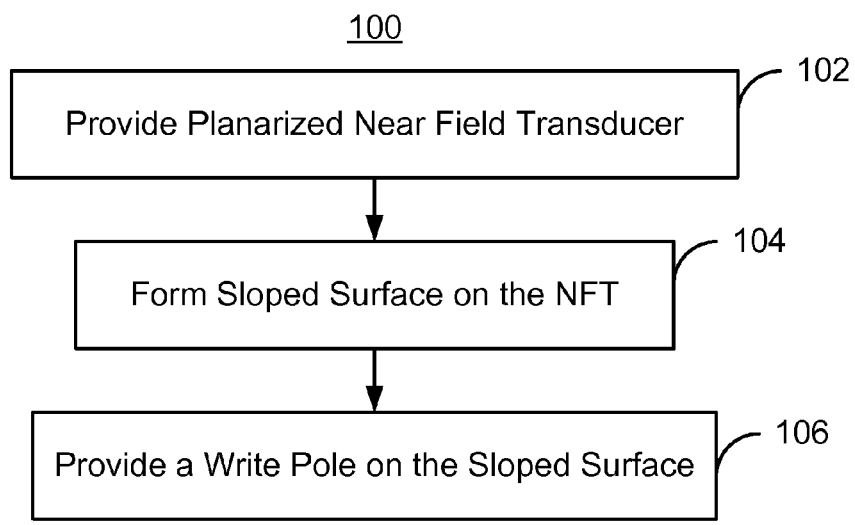
FIG. 2 is a flow chart depicting an exemplary embodiment of a method for fabricating an EAMR transducer.

FIG. 2 is an exemplary embodiment of a method 100 for providing an EAMR transducer. For simplicity, some steps may be omitted. The method 100 is also described in the context of providing a single EAMR transducer. However, the method 100 may be used to fabricate multiple transducers at substantially the same time. The method 100 is also described in the context of particular structures. A structure or layer may include multiple materials and/or multiple sub-layers and may be formed using multiple sub-steps. The method 100 also may start after formation of other portions of the EAMR transducer. For example, the method 100 may commence after formation of a read transducer. In addition, the method may start after formation of portions of the EAMR transducer. For example, a return pole and at least a portion of the waveguide may have been formed.

A planarized NFT for the waveguide is provided, via step 102. A planarized NFT is an NFT having its top surface substantially coplanar with a remaining portion of the transducer. In some embodiments, for example the planarized NFT has an insulator such as aluminum oxide adjacent to its sides. The top of the planarized NFT may be substantially coplanar with the insulator. Step 102 may include multiple substeps. For example, the planarized NFT may include a line portion and a pad portion. Further, during formation, an anchor portion may also be formed, then later removed. Thus, step 102 may include providing the line-portion proximate to the location at which the ABS is to be formed and providing an insulator adjoining the line-portion of the planarized NFT. This process may be carried out such that the insulator top is substantially coplanar with the top of the line-potion of the planarized NFT. In some embodiments, the insulator is part of a cladding of the waveguide. In order to control the size of the line portion of the planarized NFT, its formation may be accomplished using an isolated line (iso-line) mask. For example, the line portion may be formed by depositing a substantially flat metallic layer, providing an iso-line mask on the metallic layer, and removing an exposed portion of the metallic layer. The iso-line mask includes an isolated line corresponding to a line-portion of the planarized NFT. In addition, the tops of the insulator and planarized NFT may be made substantially coplanar by planarizing the EAMR transducer being formed, for example through the use of a chemical mechanical planarization (CMP). Similarly, step 102 may also include forming the pad portion of the planarized NFT. Formation of the pad portion may include providing a mask having an aperture covering at least part of the line portion of the planarized NFT, removing a portion of the planarized NFT exposed by the aperture, and providing an additional metallic layer. A portion of the additional metallic layer in the aperture forms the pad portion of the planarized NFT. Thus, once a lift-off or other mechanism for removing the mask is completed, the pad portion of the planarized NFT is formed.

A sloped surface is formed on the planarized NFT, via step 104. The sloped surface has a front edge separated from the ABS by a distance. This distance may vary depending upon the particular implementation. In some embodiments, the sloped surface makes an angle of at least twenty-five and not more than sixty-five degrees with normal to the ABS. In one such embodiment, the sloped surface makes an angle of approximately forty-five degrees with normal to the ABS. In some such embodiments, this angle is at least forty degrees and not more than fifty degrees. In some embodiments, the sloped surface is provided by depositing a flat spacer layer, forming an undercut mask having an aperture therein, and then depositing a nonmagnetic material with the undercut mask in place. The undercut mask allows for less deposition of material under the undercut. Thus, the material deposited forms a sloped surface. In other embodiment, directional deposition and/or other methods may be used to form the sloped surface.

A write pole is provided on the sloped surface, via step 106. Thus, a portion of the write pole is sloped. In some embodiments, the portion of the write pole within the distance from the ABS is substantially flat. This distance may be on the order of fifty to two hundred fifty nanometers. Step 106 may include depositing a stop layer a portion of which is on the sloped surface, then depositing a nonmagnetic layer. The nonmagnetic layer may be an insulating layer. In some embodiments, the insulating layer forms part of the cladding for the waveguide of the EAMR transducer. A trench may then be formed proximate to the ABS in the insulating layer. The trench may be formed by removing a portion of the insulating layer on the sloped surface using a process that terminates on the stop layer. The write pole may be deposited such that a portion of the write pole resides in the trench. In some embodiments, the trench in the insulating layer may be formed by planarizing the insulating layer, depositing a hard mask layer on the insulating layer, and providing a pole mask that has an aperture over the sloped surface. This aperture corresponds to the trench and thus to the pole. The pattern of the pole mask is then transferred to the hard mask layer to form a hard mask. The pole mask may be removed and the trench is etched in the insulating layer. In some embodiments, the hard mask and a portion of the stop layer are removed before a magnetic layer for the pole is deposited. This pole layer may then be planarized to form the pole.

Figure 3:
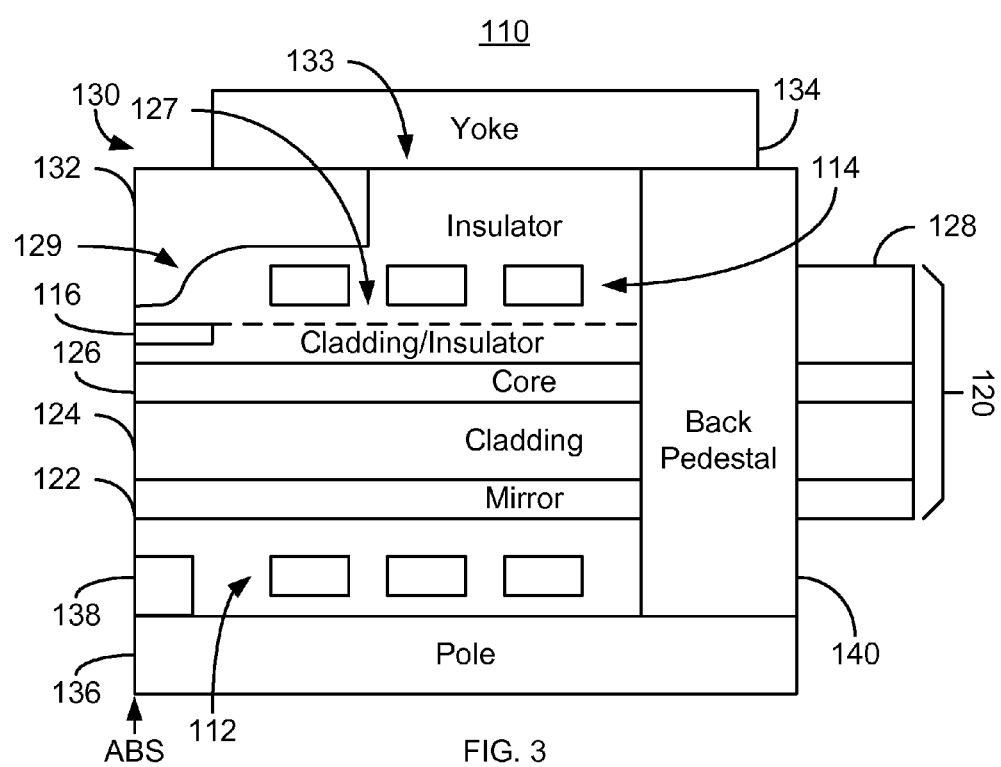
FIG. 3 depicts a side view of an exemplary embodiment of a magnetic recording transducer.

FIG. 3 depicts a side view of an exemplary embodiment of a magnetic recording transducer 110 that may be formed using the method 100. For simplicity not all portions of the EAMR transducer 110 are shown. FIG. 3 is not to scale. In addition, although the transducer 100 is depicted in the context of particular components other and/or different components may be used. Thus, the EAMR transducer 110 shown in FIG. 3 may reside on a slider and be part of a merged head including a read transducer. In addition, the EAMR transducer 110 may be used in an EAMR disk drive including read transducer(s).

The EAMR transducer 110 has an ABS configured to reside in proximity to the media (not shown in FIG. 3) during use of the EAMR transducer 110. The EAMR transducer 110 includes coils 112 and 114, a waveguide 120, and a pole 130. In the embodiment shown, the EAMR transducer 110 also includes a planarized NFT 116. The coils 112 and 114 are for energizing the pole 130. Energy from a laser or other analogous energy source (not shown) is coupled to the waveguide 120 through the grating(s) (not shown). The waveguide 120 directs energy toward the ABS. In the embodiment shown, the waveguide 120 includes a mirror 122, cladding 124 and 128, as well as a core 126. However, in other embodiments, the waveguide 120 may include other and/or different components. The pole 130 includes a write pole 132, a yoke 134, a back pedestal 140, and return pole portions 136 and 138. The write pole tip 132 is coupled to the back pedestal 140 through the yoke 134. In the embodiment shown, the waveguide 120 passes through the back pedestal 140, which may thus includes apertures (not shown) therein. However, in other embodiments, the waveguide may be direct energy to the planarized NFT 116 in another manner. Formation of many portions of the EAMR transducer 110, such as coils 112 and 114, return pole portions 136 and 138, back pedestal 140, waveguide 120 and yoke 134 are not discussed in the method 100. Thus, these portions of the EAMR transducer 110 may be formed before, after, interleaved with and/or in conjunction with the steps of the method 100.

The EAMR transducer 110 includes planarized NFT 116 having a top that is substantially coplanar with the top of the cladding/insulator 127. This planarized NFT 116 may be formed using the method 100. Further, the EAMR transducer 110 includes sloped surface 129 on which the write pole tip 132 is formed. The sloped surface 129 is a surface of insulator 133. In some embodiments, the insulator 133 is aluminum oxide.

In operation, light from the laser is provided to the grating, then the waveguide 120. The planarized NFT 116 further focuses the energy onto a small spot on the media, heating, and a small region of the media. The coils 112 and 114 energize the write pole 132 while the media is heated. Thus, the write pole 132 may write data to the media.

Using the method 100, fabrication and performance of the EAMR transducer 110 may be improved. A smaller optical spot may be provided by the EAMR transducer. More specifically, when an iso-line mask is used in forming the line portion of the planarized NFT 116, a very narrow planarized NFT 116 may be fabricated. A smaller spot size and, therefore, higher density tracks may thus be achieved. Because the planarized NFT 116 is substantially co-planar with adjoining structures, a substantially planar surface is formed. Therefore, manufacturing of subsequent layers, including the sloped surface 129, may be facilitated. Further, the bottom portion of the write pole 132 proximate to the ABS is substantially flat and thus equidistant from the planarized NFT 116. The sloped surface 129, however, allows the bottom surface of the write pole 132 further from the ABS to be a greater distance from the waveguide 120. The magnetic field in the write pole 132 may be less likely to interfere with performance of the optics in the waveguide 120. Consequently, performance of the waveguide 120 and thus the EAMR transducer 110 may be improved.

Figure 4:
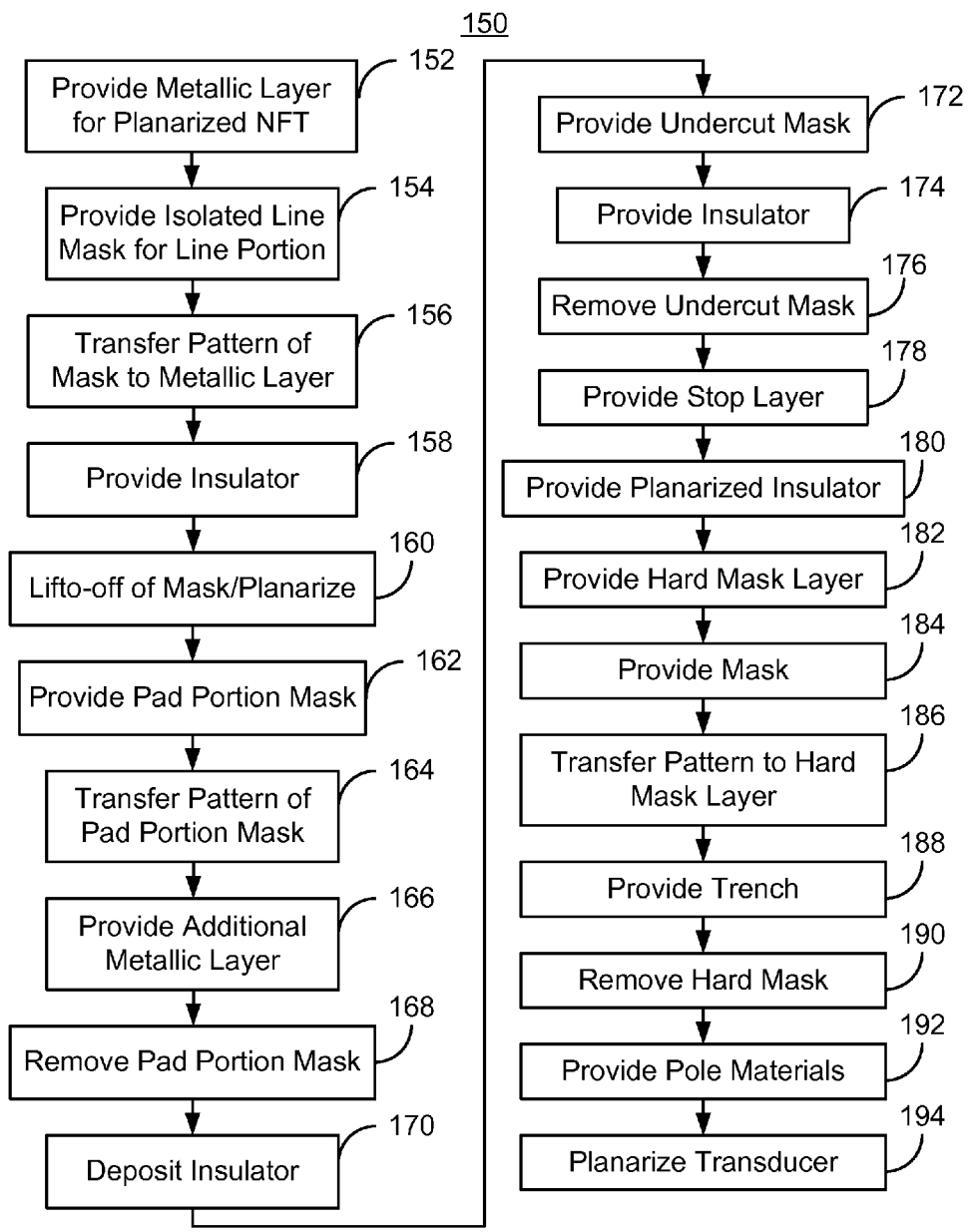
FIG. 4 is a flow chart depicting another exemplary embodiment of a method for fabricating a magnetic recording transducer.

FIG. 4 is a flow chart depicting another exemplary embodiment of a method 150 for fabricating a magnetic recording transducer. FIGS. 5-23 each depict cross section, ABS and plan views of an exemplary embodiment of an EAMR transducer 200 during fabrication. Note that the ABS view is taken at the location of the ABS, marked by dashed line in the top view in FIGS. 5-23. The method 150 is also described in the context of particular structures. A structure or layer may include multiple materials and/or multiple sub-layers. Structures may be formed using multiple sub-steps. The method 150 also may start after formation of other portions of the EAMR transducer. For example, the method 150 may commence after formation of a read transducer. In addition, the method may start after formation of portions of the EAMR transducer 200. For example, a return pole and at least a portion of the waveguide may have been formed. For clarity, only a portion of the EAMR transducer 200 is shown. In addition, steps may be omitted or combined in the method 150.

A metallic layer, such as Au, is deposited, via step 152. In some embodiments, other layers, such as tantalum oxide ($Ta_2O_5$) and aluminum oxide (e.g. $Al_2O_3$) have also been deposited. These layers may form part of the waveguide.

Figure 5:
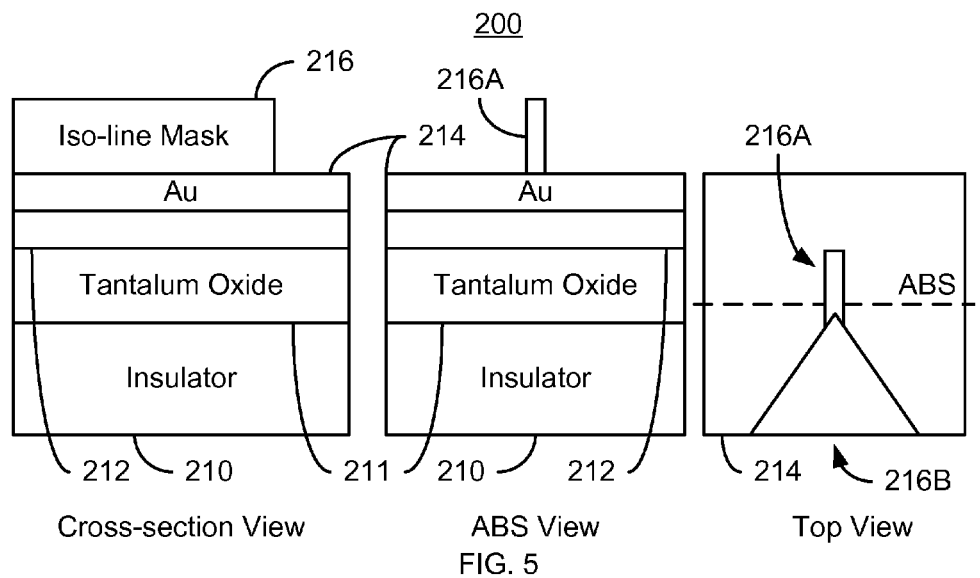
FIGS. 5-23 depicts plan and ABS views of an exemplary embodiment of an EAMR transducer during fabrication.

An iso-line mask is provided on the metallic layer, via step 154. The iso-line mask provided in step 154 is typically a photoresist mask. The iso-line mask includes an isolated line that corresponds to a line-portion of the planarized NFT proximate to the ABS. FIG. 5 depicts the EAMR transducer 200 after step 154 is performed. Thus, underlying aluminum oxide layer 210, tantalum oxide layer 212, insulating layer 213, and metal layer 214 are shown. In some embodiments, the metal layer 214 is Au. Also shown is iso-line mask 216. The iso-line mask 216 includes a line portion 216A and an anchor portion 216B. The anchor portion 216B is generally not present in the final device. Instead, portions of the wafer are lapped and/or otherwise removed to expose the ABS.

Figure 6:
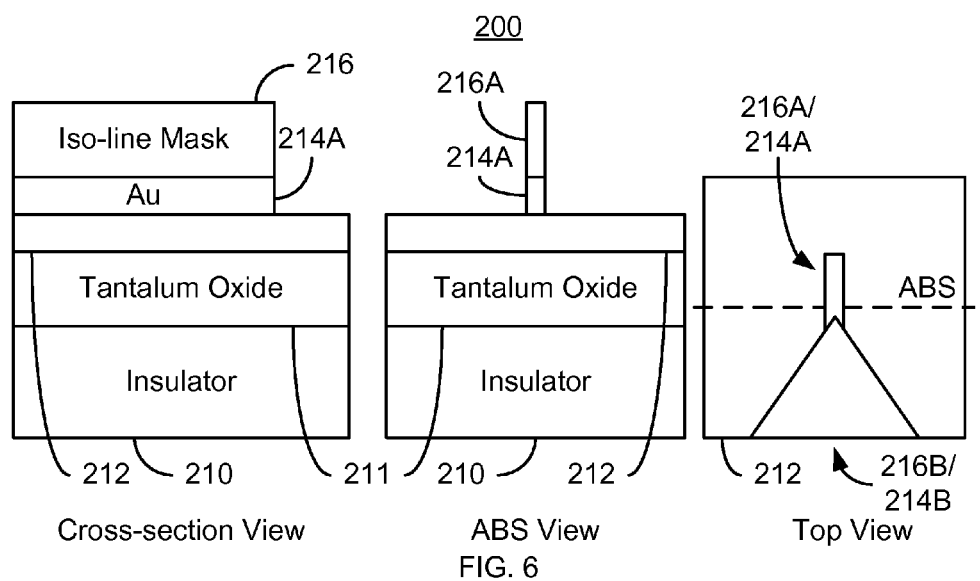
Figure 7:
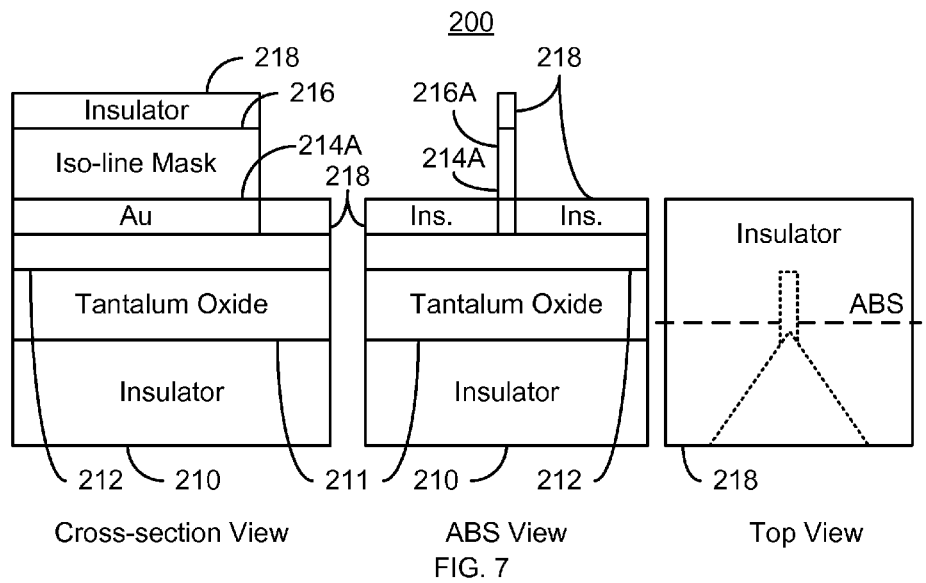
Figure 8:
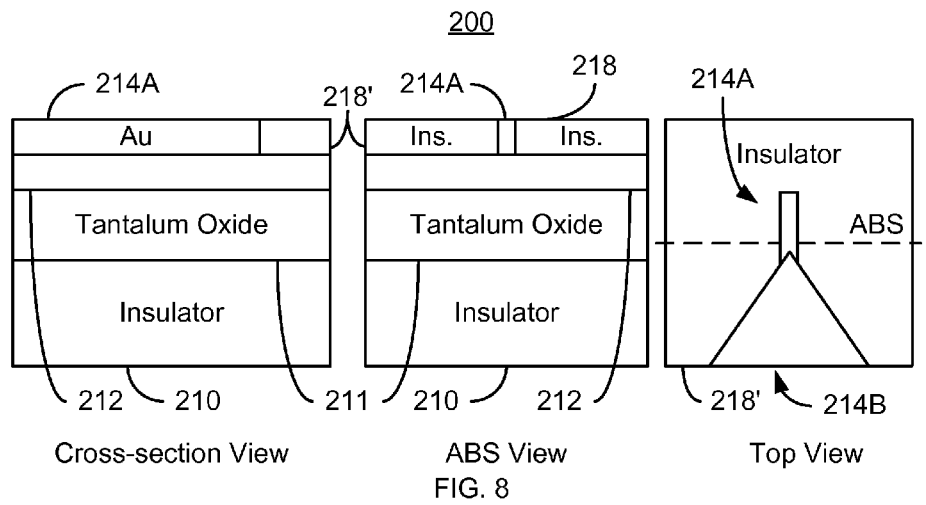

The pattern of the iso-line mask 216 is then transferred to the metallic layer 214, via step 156. Step 156 is carried out by removing an exposed portion of the metallic layer 216. FIG. 6 depicts the EAMR transducer 200 after step 214 is performed. Thus, a portion of the metallic layer 214 has been removed, leaving metallic structure 214A and 214B. The remaining portion of the metallic layer 214 has a line portion 214A and an anchor portion 214B. The line-portion 214A of the planarized NFT is proximate to the ABS;

An insulator is deposited, via step 158. In some embodiments, aluminum oxide is deposited in step 158. FIG. 7 depicts the EAMR transducer 200 after step 158 is performed. Consequently, insulator 218 is shown. The insulator 218 covers the top of the EAMR transducer 200. Consequently, the location of the iso-line mask 216 is shown by dotted lines in the top view of FIG. 7. A portion of the insulator 216 adjoins the line portion 214A of the planarized NFT. The iso-line mask 216 may be removed, via step 160. Also in step 160, a low pressure and/or brief planarization may be performed. For example, a CMP of 1-4 psi might be used for such a CMP. Thus, a CMP may also be performed in step 160. FIG. 8 depicts the EAMR transducer 200 after step 160 is performed. Thus, the portion 218' of the insulator adjacent to the metal 214A and 214B remains. The top of the line portion 214A of the planarized NFT is substantially coplanar with the insulator 218'. In addition, in some embodiments, the top of the anchor portion 214B is also substantially coplanar with the top of the insulator 218'. In some embodiments, the insulator 218' forms a portion of the cladding of the waveguide. Thus, in steps 152-160, the line portion 214A of the planarized NFT is provided.

Figure 9:
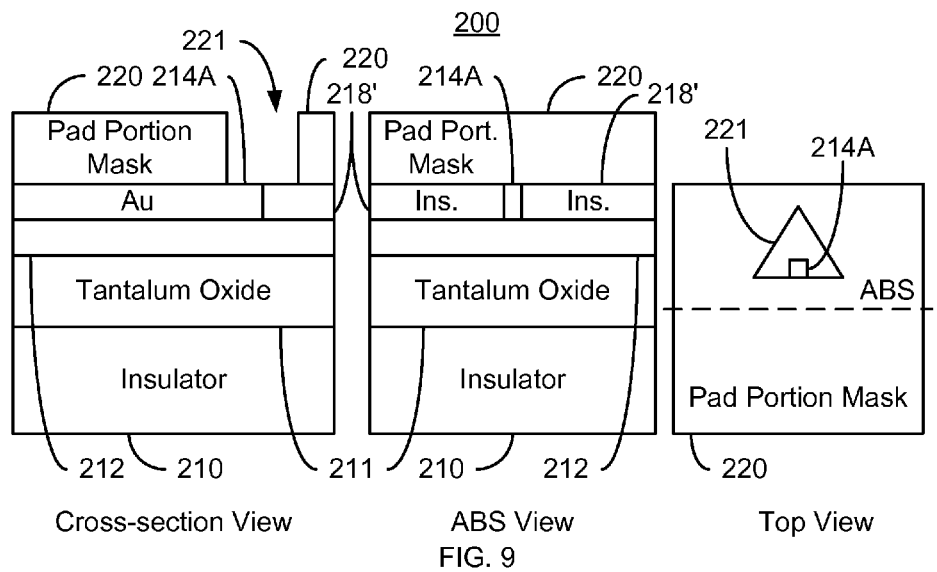

A mask for the pad portion of the planarized NFT is provided, via step 162. FIG. 9 depicts the EAMR transducer 200 after step 162 is performed. Thus, pad portion mask 220 is shown. In some embodiments, the pad portion mask 220 is a photoresist mask. The pad portion mask 220 includes aperture 221. In the embodiment shown, the aperture 221 is triangle shaped. However, other shapes may be used for the pad. Part of the line portion 214A of the planarized NFT may be exposed by the aperture 221.

Figure 10:
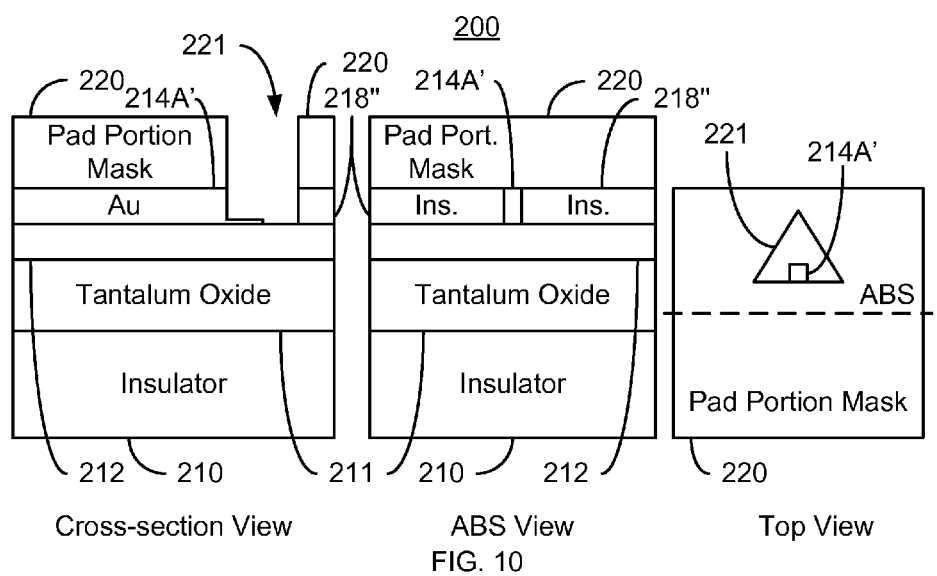

The pattern of the pad portion mask 110 is transferred to the transducer 200, via step 164. FIG. 10 depicts the transducer 200 after step 164 is performed. Thus, the exposed portion of the metallic layer 214' and insulator 218' have been substantially removed. Thus, remaining portion of the insulator 218" and line portion 214A' of the planarized NFT are shown. In some embodiments, all of the exposed line portion 214A' would be removed.

Figure 11:
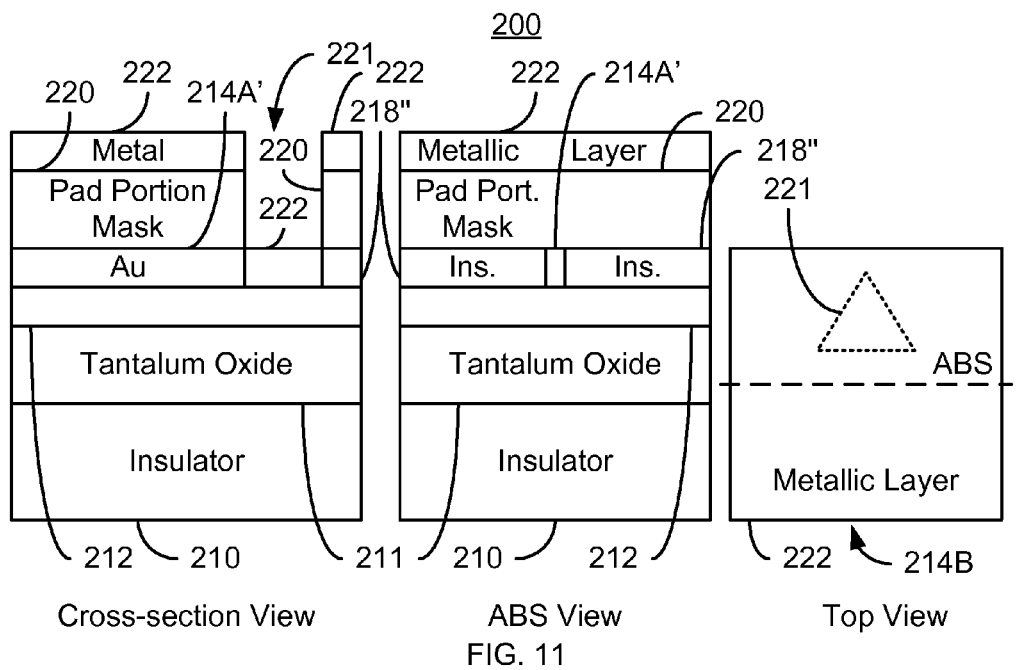

An additional metallic layer is provided, via step 166. In some embodiments, an Au layer is provided. FIG. 11 depicts the EAMR transducer 200 after step 168 is performed. Thus, metallic layer 222 is shown. A portion of the metallic layer 222 resides in the aperture 221. Consequently, the aperture 221 is shown as a dotted line in the top view of FIG. 11.

Figure 12:
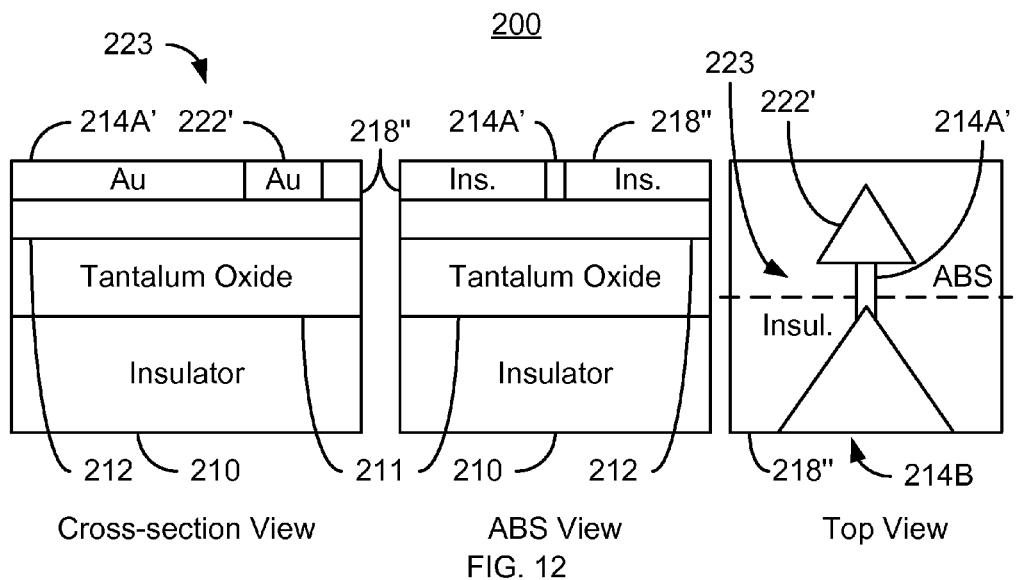

The pad portion mask 220 is removed, via step 168. In some embodiments, a lift off is performed. FIG. 12 depicts the EAMR transducer 200 after step 168 is performed. Thus, the line portion 214A' of the NFT and the pad portion 222' of the planarized NFT are shown. Steps 162-168 may be viewed as forming the pad portion of the planarized NFT. Anchor portion 214B is also depicted. Thus, the planarized NFT 223 including pad portion 222' and line portion 2134' is fabricated. As can be seen in FIG. 12, the top of the planarized NFT 223, both the pad portion 222' and the line portion 214A', are substantially coplanar with the top of the insulator 218". Thus, step 152-168 may be viewed as forming the planarized NFT 223.

Figure 13:
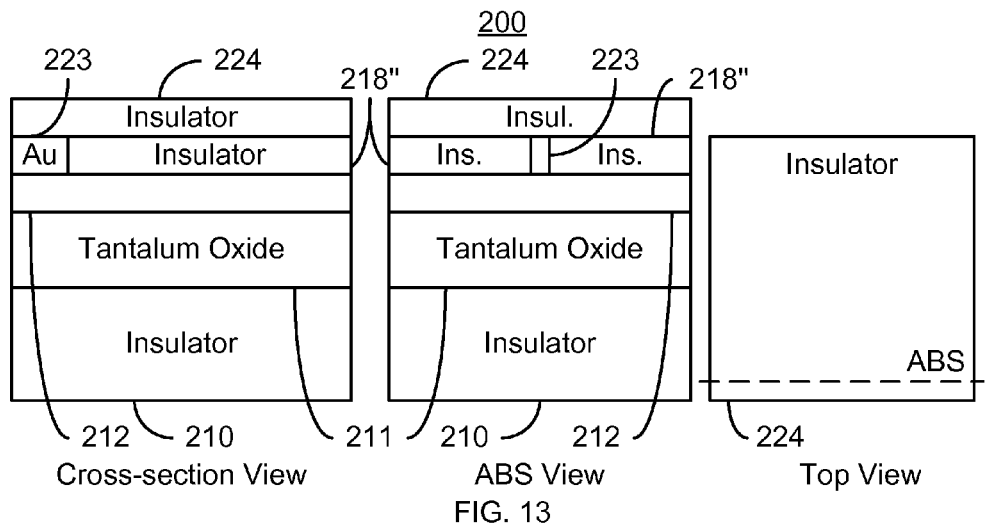

An insulator is deposited, via step 170. In some embodiments, aluminum oxide is deposited in step 170. FIG. 13 depicts the EAMR transducer 200 after step 170 is performed. Thus, insulator 224 is provided. For clarity, the line portion 214A' and pad portion 222' are not labeled. Instead, planarized NFT 223 is labeled. In addition, note that the scale in the cross-section view has changed. However, the drawings are still not to scale. In some embodiments, the insulator 224 is aluminum oxide. A portion of the insulator acts as a spacer between the planarized NFT 223 and the write pole to be formed. In some embodiments, the insulator 224 is at least ten and not more than fifty nanometers thick.

Figure 14:
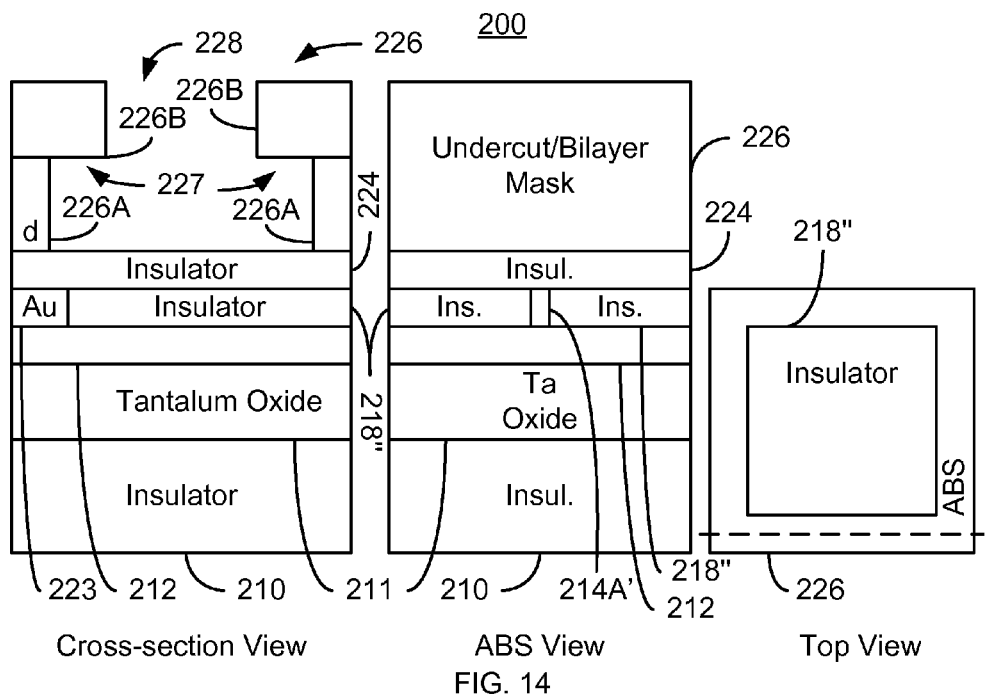

An undercut mask is provided, via step 172. Step 172 may include forming a bilayer photoresist mask. FIG. 14 depicts the EAMR transducer 200 after step 172 is performed. Thus, undercut mask 226 has been formed. The undercut mask 226 includes a lower portion 226A and an upper portion 226B. In some embodiments, the lower portion 226A and upper portion 226B are formed by different layers of a bilayer mask. In addition, the undercut mask 226 includes aperture 228. The lower portion 226A extends a depth, d from the ABS. The upper portion 226B extends farther from the ABS, forming undercut 227. Further, because the undercut mask 226 is formed on a substantially flat surface of the insulator 224, the undercut mask 226 may be configured substantially as desired.

Figure 15:
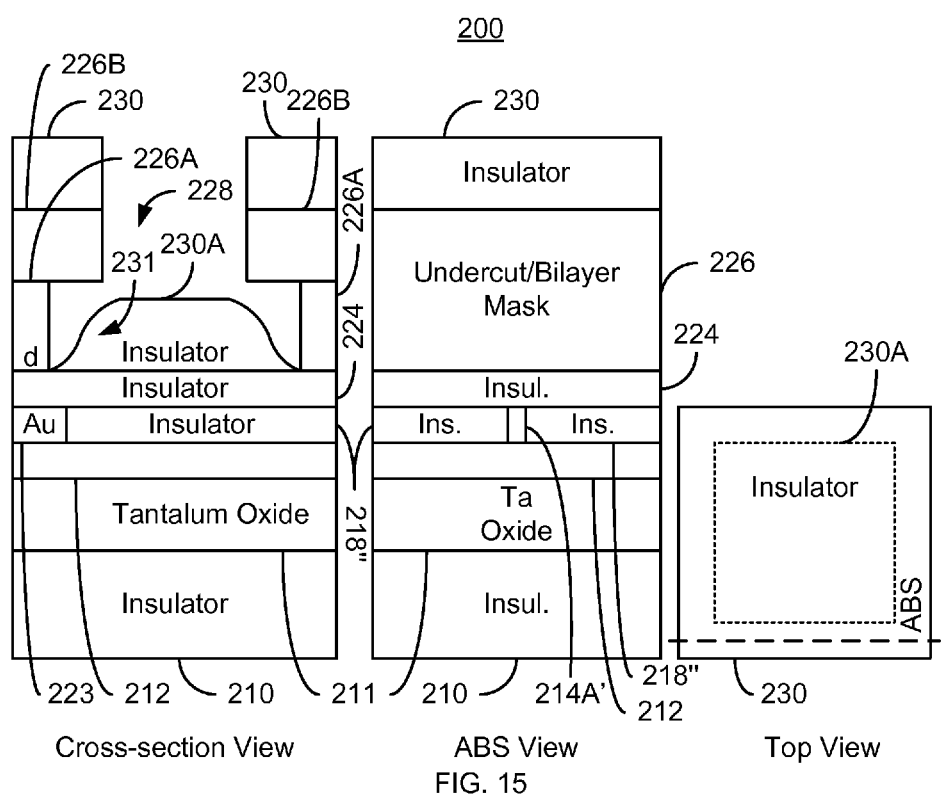

An insulator is provided, via step 174. In some embodiments step 174 includes depositing a layer of aluminum oxide. FIG. 15 depicts the EAMR transducer 200 after step 174 is performed. For clarity, undercut 227 is not labeled. Thus, insulating layer 230 is provided. A portion of the insulator 230A resides in the aperture 228. Because of the presence of the undercut mask 226, the insulator 230A naturally forms the sloped surface 231. More specifically, the insulator 230A has a front, sloped surface 231. Because of the bottom portion 226A of the undercut mask 226, the front of the insulator 230A is separated from the ABS by the distance, d. In some embodiments, the insulator 230A is part of the cladding of the waveguide (not separately labeled).

Figure 16:
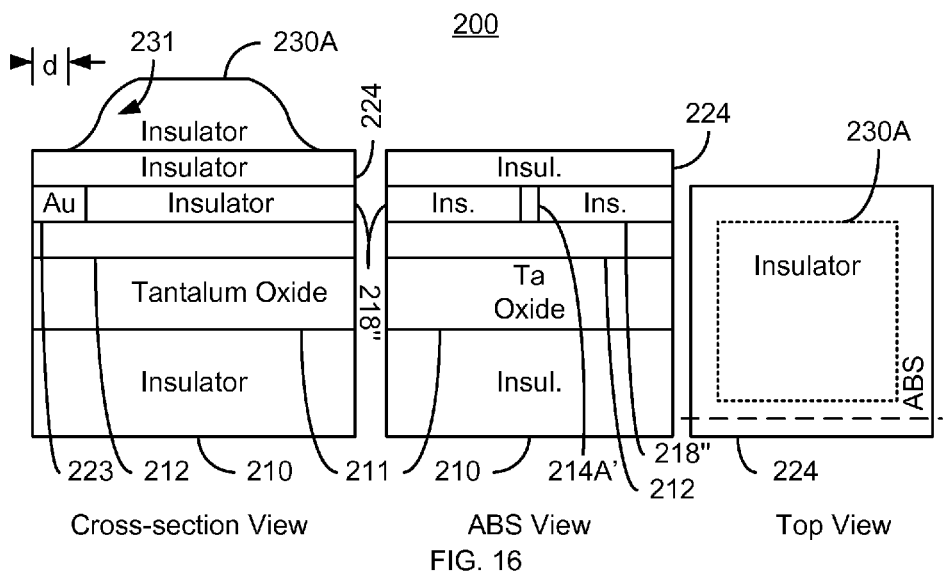

The undercut mask 226 is removed, via step 176. In some embodiments, a lift off is carried out in step 176. FIG. 16 depicts the transducer after step 176 is performed. Thus, the insulator 230A having sloped surface 231 is formed. The front of the sloped surface 231 is separated from the ABS by the distance d. Thus, steps 170-176 may be considered to form the insulator 230A having the sloped surface 231.

Figure 17:
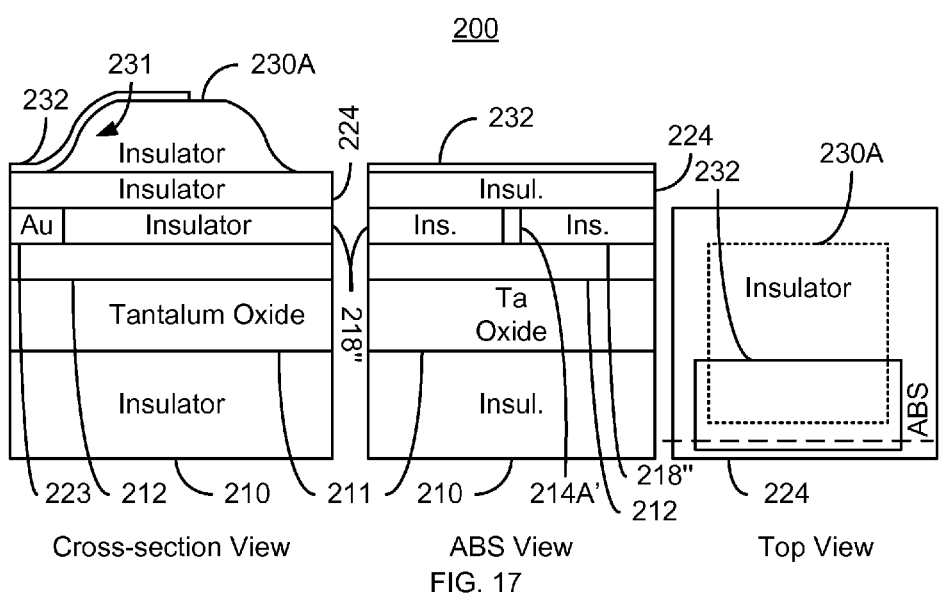

A stop layer is provided, via step 178. In some embodiments, step 178 includes providing a mask with an aperture over the portion of the EAMR transducer 200 on which the stop layer is desired. The stop layer may then be deposited and the mask removed, for example using a lift off process. FIG. 17 depicts the transducer 200 after step 178 is performed. Thus, a stop layer 232 is formed on the sloped surface 231. In some embodiments, the stop layer 232 includes materials such as Ru, which are insensitive to an etch that removes the insulator 230A. In some embodiments, the stop layer may also function as a seed layer for the pole being formed. In some embodiments, the stop layer is 25-30 nm thick.

Figure 18:
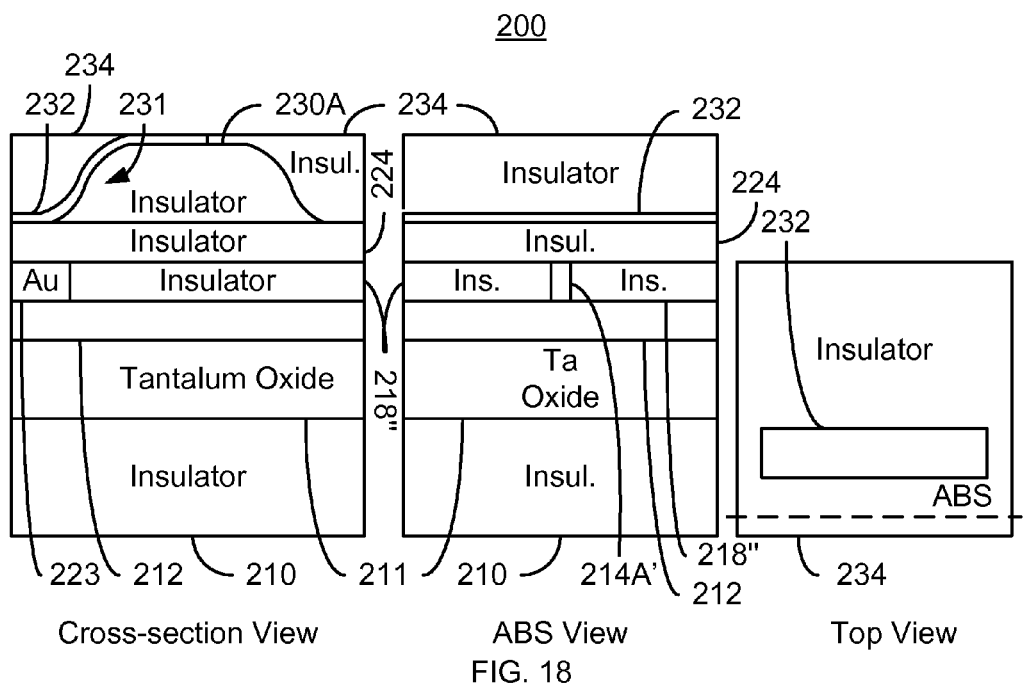

A planarized insulator is provided, via step 180. Step 180 may include depositing an insulating layer such as an aluminum oxide layer, then planarizing the EAMR transducer 200. The planarization step continues until a portion of the stop layer 232 at the top of the insulator 230A is exposed. FIG. 18 depicts the transducer after step 180 is performed. Thus, insulator 234 is shown. Further, a portion of the stop layer 232 on insulator 230A may be exposed.

Figure 19:
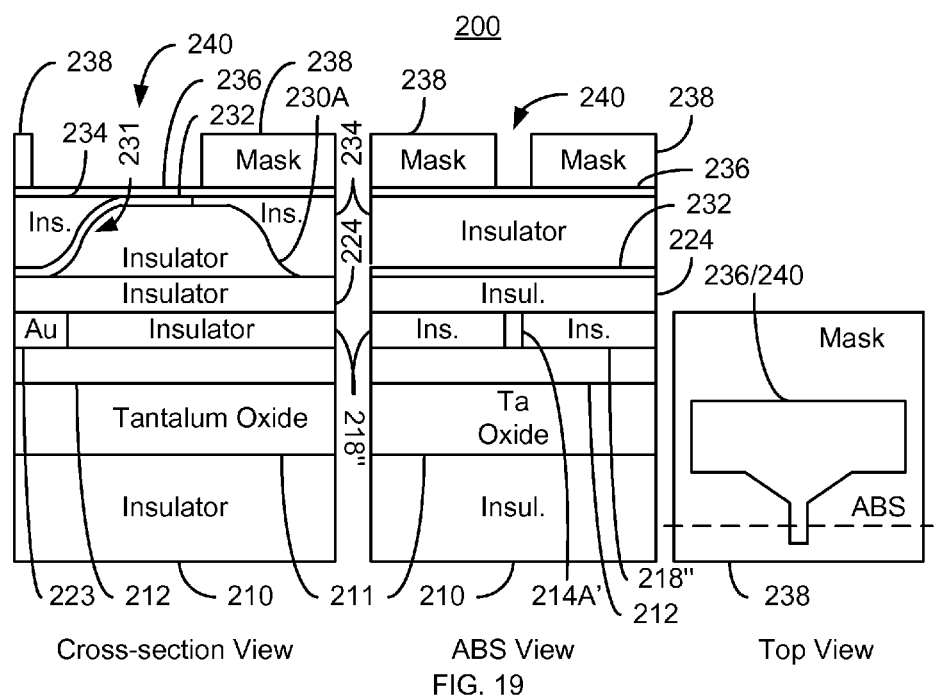

A hard mask layer is provided, via step 182. In some embodiments, formation of the hard mask layer 182 includes blanket depositing a material, such as Ru, which is insensitive to an etch that removes the insulator 234. A mask having an aperture over the region in which the pole is to be formed is provided, via step 184. FIG. 19 depicts the transducer 200 after step 184 is performed. Thus, hard mask layer 236 and mask 238 are shown. The mask 238 includes aperture 240. This aperture 240 has the desired size of the pole and is aligned with the region in which the pole is to be formed.

Figure 20:
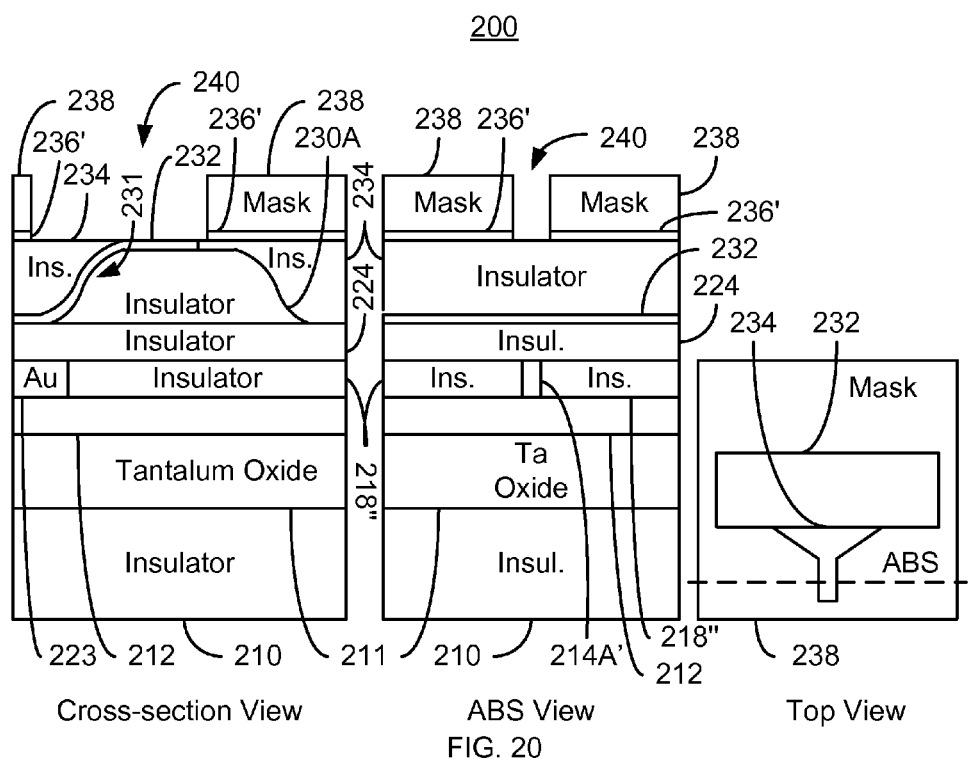
Figure 21:
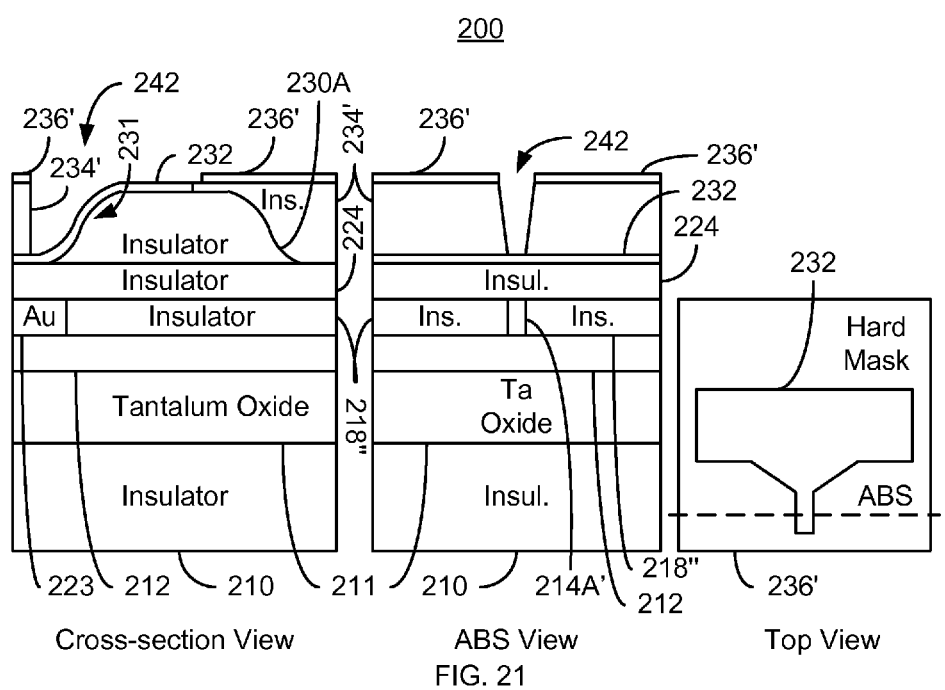

The pattern of the mask is then transferred to the hard mask, via step 186. FIG. 20 depicts the transducer after step 186 is performed. Thus, hard mask 236' is shown. A trench in the insulator 234 is formed, via step 188. Step 188 includes performing an etch, such as a reactive ion etch capable of removing insulator 234. Further, the mask 238 may be removed. FIG. 21 depicts the transducer 200 after step 188 is performed. Thus, trench 242 in insulator 234' is shown. The trench 242 is configured to fit the desired profile and location of the bottom surface of a pole.

Figure 22:
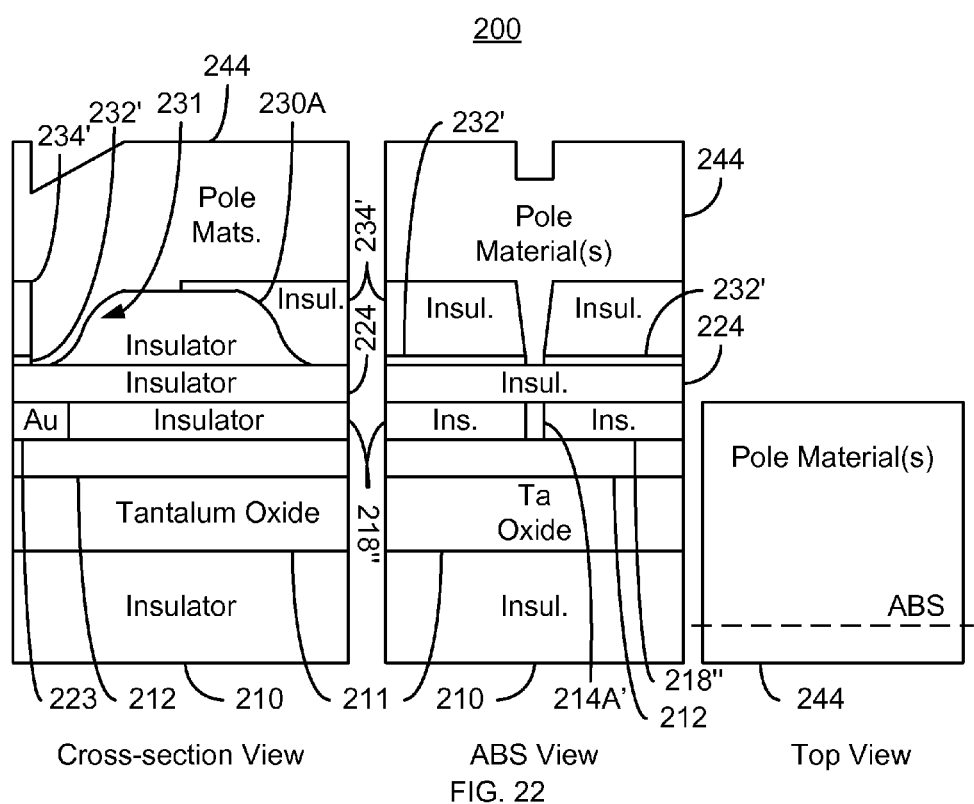

The hard mask 236' is removed, via step 190. The pole material(s) are provided, via step 192. Step 192 may include depositing a seed layer in addition to depositing magnetic material(s) for the pole. FIG. 22 depicts the transducer 200 after step 190 is performed. Magnetic material(s) 244 are thus shown. For clarity, trench 242 is not labeled. Portions of the layer 232 have been removed, leaving stop layer 232'.

Figure 23:
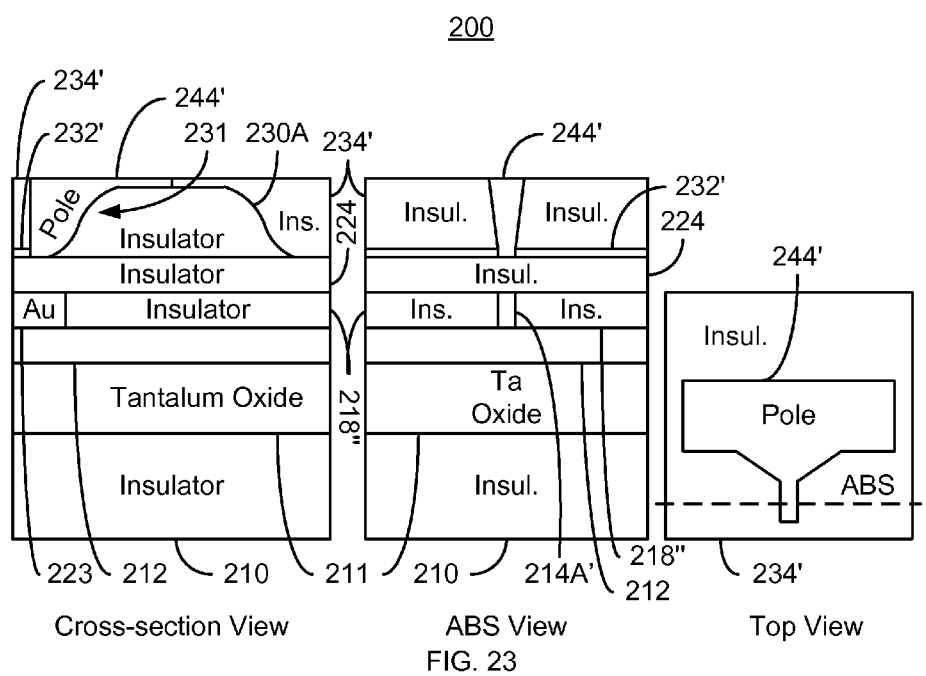

The transducer may then be planarized, via step 194. For example, a CMP may be performed. FIG. 23 depicts the transducer 200 after step 194 is performed. Thus, pole 244' has been formed. Additional portions of the pole 244' as well as other part of the EAMR transducer 200 may also be formed. For example, a yoke, portions of the back gap, and/or other structures may be fabricated. In addition, the transducer 200 is typically lapped or otherwise polished so that the front of the pole 244' is at the ABS.

Using the method 150, the transducer 200 may be formed. Because the iso-line mask 216' is used in forming the line portion of the planarized NFT 223, a very narrow planarized NFT 223 may be fabricated. A smaller spot size and, therefore, higher density tracks may thus be achieved. Because the planarized NFT 223 is substantially co-planar with adjoining structures, a substantially planar surface is formed. Thus, damage to the planarized NFT 223 may be less likely. Further, manufacturing of subsequent layers, including the sloped surface 129, may be facilitated. Because it is formed on the sloped surface 231, the bottom surface of the write pole 244' is farther from the waveguide. The magnetic field in the write pole 244' may be less likely to interfere with performance of the optics in the waveguide. However, the portion of the pole 244' proximate to the ABS is substantially flat and a substantially constant distance from the planarized NFT 223. Consequently, performance of the waveguide and thus the EAMR transducer 200 may be improved.

We claim:

1. A method for providing energy assisted magnetic recording (EAMR) transducer having an air-bearing surface (ABS) and a waveguide, the method comprising:
   providing a planarized near field transducer (NFT) for the waveguide, the planarized NFT having at least one side and a top surface substantially coplanar with a portion of the EAMR transducer adjoining the at least one side of the planarized NFT upon completion of the planarized NFT;
   forming a sloped surface on the planarized NFT, the sloped surface having a front edge separated from the ABS by a distance; and
   providing a write pole on the sloped surface.

2. The method of claim 1 wherein the step of providing a planarized NFT further includes:
   providing at least a line-portion of the planarized NFT proximate to the ABS and having a top; and
   providing an insulator adjoining the line-portion of the planarized NFT and having an insulator top substantially coplanar with the top of the line-potion of the planarized NFT, the insulator being part of a cladding of the waveguide.

3. The method of claim 2 wherein the step of providing the at least the line-portion of the planarized NFT further includes:
   depositing a substantially flat metallic layer;
   providing an isolated line mask on the metallic layer, the isolated line mask including an isolated line corresponding to a line-portion of the planarized NFT proximate to the ABS; and
   removing an exposed portion of the metallic layer to provide the line portion of the planarized NFT proximate to the ABS.

4. The method of claim 2 wherein the step of providing the insulator further includes:
   planarizing the transducer such that the top of the line-portion of the planarized NFT is substantially coplanar with the insulator top.

5. The method of claim 2 wherein the isolated-line portion of the planarized NFT is formed using an isolated line mask, and wherein the step of providing the insulator further includes:
   providing an insulating layer;
   performing a lift off of the isolated line mask; and
   optionally performing a chemical mechanical polish.

6. The method of claim 2 wherein the step of providing the planarized NFT further includes
   providing a pad-portion of the planarized NFT.

7. The method of claim 6 wherein the step of providing the pad portion further includes:
   providing a pad portion mask having a pad aperture covering at least a portion of the line-portion of the planarized NFT;
   removing an exposed portion of the planarized NFT;
   providing an additional metallic layer;
   performing a lift off of the pad-portion mask.

8. The method of claim 1 wherein the step of providing the sloped surface further includes:
   providing a spacer layer above the planarized NFT, the spacer layer corresponding to a portion of a cladding of the waveguide;
   providing an undercut mask on the spacer layer, the undercut mask having an undercut aperture therein, a portion of the undercut aperture being spaced apart from the ABS by substantially the distance;

depositing an insulator, a portion of the insulator residing in the aperture, having the sloped surface, and being an additional portion of the cladding of the waveguide.

9. The method of claim 1 wherein the step of providing the pole further includes:
   depositing a stop layer, a portion of the stop layer residing on the sloped surface;
   providing an insulating layer on the stop layer; and
   removing a portion of the insulating layer, the insulating layer having a trench corresponding to the pole formed therein,
   providing at least a portion of the pole in the trench.

10. The method of claim 9 wherein the step of removing the portion of the insulating layer further includes:
    planarizing the insulating layer;
    providing a hard mask layer on the insulating layer;
    providing a pole mask having a pole aperture therein, the pole aperture corresponding to the pole;
    removing a portion of the hard mask layer exposed by the pole aperture to provide a hard mask having a hard mask aperture therein;
    removing the portion of the insulating layer exposed by the hard mask aperture to form the trench.

11. The method of claim 10 wherein the step of providing the at least the portion of the pole in the trench further includes:
    removing the hard mask and a portion of the stop layer;
    providing at least one pole layer;
    planarizing the at least one pole layer.

12. A method for providing heat assisted magnetic recording (EAMR) transducer including a waveguide and having an air-bearing surface (ABS) comprising:
    providing a planarized near field transducer (NFT) having at least one side and a top surface substantially coplanar with a portion of the EAMR transducer adjoining at least one side of the planarized NFT upon completion of the planarized NFT, the step of providing the planarized NFT further including:
       depositing a substantially flat metallic layer;
       providing an isolated line mask on the metallic layer, the isolated line mask including an isolated line corresponding to a line-portion of the planarized NFT proximate to the ABS;
       removing an exposed portion of the metallic layer to provide the line-portion of the planarized NFT proximate to the ABS;
       providing an insulator adjoining the line-portion of the planarized NFT and having an insulator top substantially coplanar with the top of the line-potion of the planarized NFT, the insulator forming a first portion of the cladding of the waveguide;
       providing a pad portion mask having a pad aperture covering at least a portion of the line-portion of the planarized NFT;
       removing an exposed portion of the line-portion of the planarized NFT;
       providing an additional metallic layer;
       performing a lift off of the pad portion mask;
    forming a second portion of the cladding having a sloped surface on the planarized NFT using an undercut mask having an aperture therein, the aperture having an undercut, the sloped surface having a front edge separated from the ABS by a distance; and
    providing a write pole on the sloped surface, the step of providing the write pole further including
       depositing a stop layer, a portion of the stop layer residing on the sloped surface;
       providing an insulating layer on the stop layer; and
       removing a portion of the insulating layer, a remaining portion the insulating layer having a trench corresponding to the pole formed therein and forming a third portion of the cladding,
       providing at least one pole layer;
       planarizing the at least one pole layer.

13. The method of claim 12 wherein the steps of depositing the substantially flat metallic layer, providing the isolated line mask, removing an exposed portion of the metallic layer, providing the insulator, providing the pad portion mask, removing an exposed portion of the line-portion of the planarized NFT, providing the additional metallic layer, and performing a lift off are performed sequentially.

* * * * *